(12) United States Patent
Takenaka et al.

(10) Patent No.: US 6,332,372 B1
(45) Date of Patent: Dec. 25, 2001

(54) ARM STRUCTURE FOR MAN TYPE WORKING ROBOTS

(75) Inventors: Toru Takenaka; Takayuki Kawai; Tadaaki Hasegawa; Takashi Matsumoto; Hiroshi Gomi; Hideaki Takahashi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,220

(22) PCT Filed: Oct. 28, 1998

(86) PCT No.: PCT/JP98/04734

§ 371 Date: Jun. 22, 2000

§ 102(e) Date: Jun. 22, 2000

(87) PCT Pub. No.: WO99/33617

PCT Pub. Date: Jul. 8, 1999

(30) Foreign Application Priority Data

Dec. 24, 1997 (JP) .................................................... 9-354604

(51) Int. Cl.[7] .................................................... B25J 9/06
(52) U.S. Cl. .................................................... 74/490.05; 901/16
(58) Field of Search .................................. 74/490.05, 490.01; 901/15, 16

(56) References Cited

U.S. PATENT DOCUMENTS

| | | | |
|---|---|---|---|
| 4,575,297 | * 3/1986 | Ritcher | 901/22 X |
| 5,142,803 | * 9/1992 | Lang | 901/14 X |
| 5,624,398 | * 4/1997 | Smith et al. | 901/35 X |
| 5,845,540 | * 12/1998 | Rosheim | 901/28 X |
| 6,155,960 | * 12/2000 | Roberts et al. | 482/83 |
| 6,198,247 | * 3/2001 | Barr | 318/568.1 |

FOREIGN PATENT DOCUMENTS

| | | |
|---|---|---|
| 52-75760 | 6/1977 | (JP) . |
| 64-9087 | 1/1989 | (JP) . |
| 1-252380 | 10/1989 | (JP) . |
| 4-315589 | 11/1992 | (JP) . |
| 2000-263479A | * 9/2000 | (JP) . |

* cited by examiner

Primary Examiner—Richard M. Lorence
Assistant Examiner—Saúl Rodríguez
(74) Attorney, Agent, or Firm—Arent, Fox, Kintner, Plotkin & Kahn, PLLC (57) ABSTRACT

An arm structure for anthropomorphic robots minimizes the occurrence of a singularity state of a shoulder joint assembly while the arm of the anthropomorphic robot is normally working, for thereby allowing the arm to operate smoothly. The position and posture of first through third joints (11), (13), (15) of a shoulder joint assembly (5) and the position of an elbow joint assembly (6) with respect to the third joint (15) are established such that the elbow joint assembly (6) is located above a horizontal plane lying through the point of intersection of the axes (10), (12), (14) of the first through third joints (11), (13), (15), while the shoulder joint assembly (5) is operated into a singularity state wherein the first axis (10) of the first joint (11) and the third axis (14) of the third joint (15) are aligned with each other and the elbow joint assembly (6) is positioned laterally of a torso (1).

3 Claims, 8 Drawing Sheets

FIG. 1

RIGHT ⟷ LEFT

FORWARD ← → BACKWARD

FIG. 4

RIGHT ← → LEFT

ARM STRUCTURE FOR MAN TYPE WORKING ROBOTS

TECHNICAL FIELD

The present invention relates to an arm structure for anthropomorphic robots.

BACKGROUND ART

Figure 7:
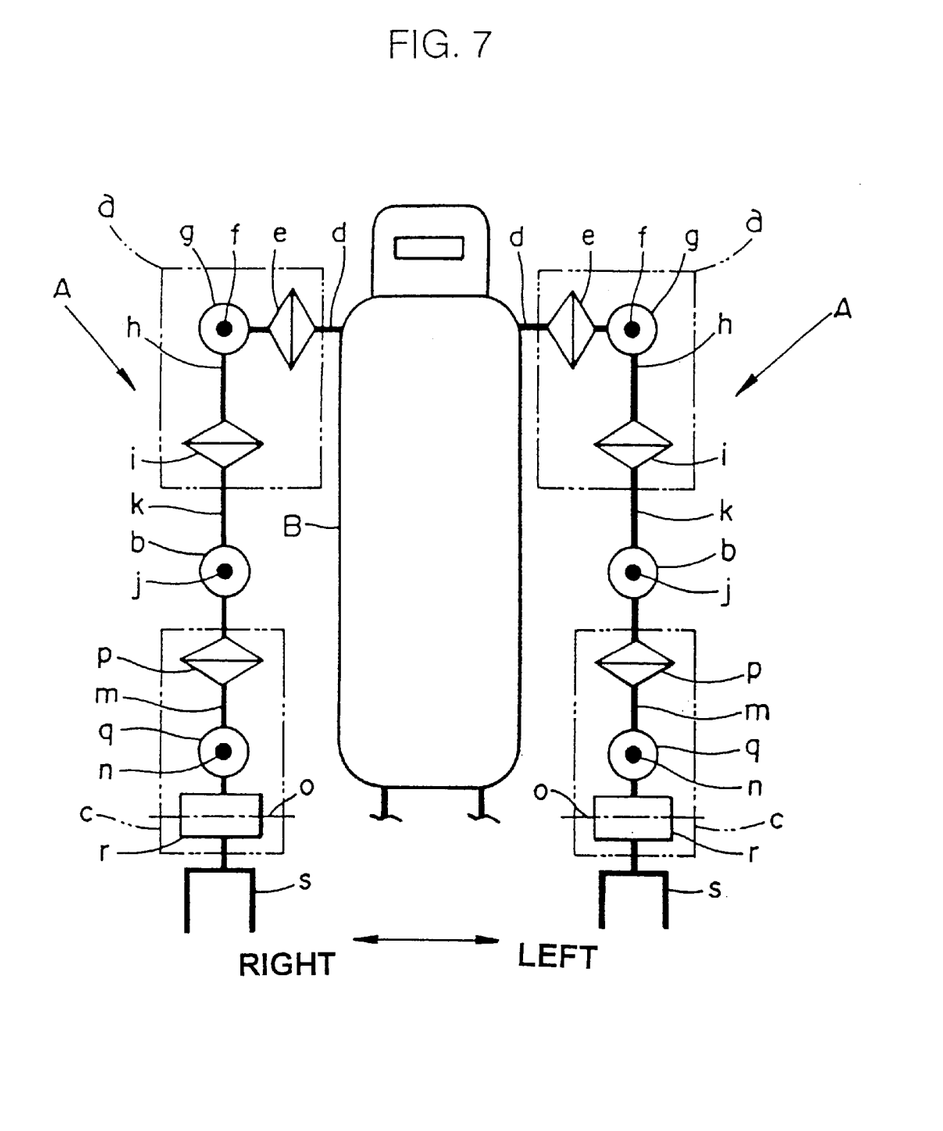
FIG. 7 is a schematic front elevational view of a conventional anthropomorphic robot.

One generally known anthropomorphic robot which has arms on both sides of the torso like the human being employs an arm joint structure as shown in FIG. 7 of the accompanying drawings.

The anthropomorphic robot has arms A each having a shoulder joint assembly a, an elbow joint assembly b, and a wrist joint assembly c. The shoulder joint assembly a comprises a first joint e coupled to a torso B for rotation about a first axis d which extends horizontally from an upper side of the torso B, a second joint g coupled to the first joint e for rotation about a second axis f (perpendicular to the sheet of FIG. 7) normal to the first axis d, and a third joint i coupled to the second joint g for rotation about a third axis h normal to the second axis f. The first through third joints e, g, i are positionally related to each other such that the first through third axes d, f, h intersect at one point in arbitrary operating positions (angular positions) of the first through third joints e, g, i.

The elbow joint assembly b comprises a fourth joint b coupled to the third joint i of the shoulder joint a by an upper arm k for rotation about a fourth axis j (perpendicular to the sheet of FIG. 7). The wrist joint assembly c comprises fifth through seventh joints p, q, r that are successively coupled to the elbow joint assembly b for rotation about respective fifth through seventh axes m, n, o (which are normal to each other in the illustrated state). A hand s is coupled to the distal end of the wrist joint assembly c.

The above structure of each of the arms A allows the shoulder joint assembly a, the elbow joint assembly b, and the wrist joint assembly c to operate in substantially the same fashion as human arms.

In the robot shown in FIG. 7, the elbow joint assembly b is positioned on the third axis h of the third joint i of the shoulder joint assembly a. However, the elbow joint assembly b may be coupled to the third joint at a position radially spaced from the third axis of the third joint.

Figure 8:
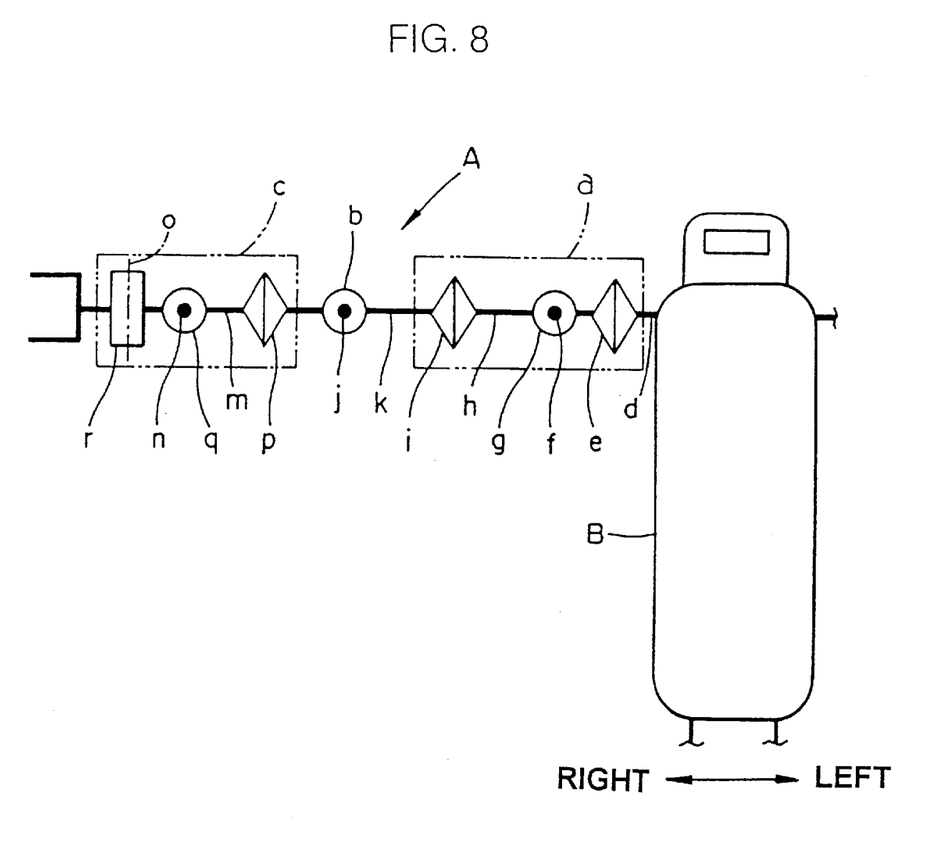
FIG. 8 is a view illustrative of operation of a central part of the robot shown in FIG. 7.

With the arm A of the robot having the above structure, as shown in FIG. 8, the first axis d of the first joint e and the third axis h of the third joint i of the shoulder joint assembly a may be aligned with each other, and such an aligned state is referred to as a singularity state (or singularity posture). The singularity state refers to a state wherein the first axis d of the first joint e and the third axis h of the third joint i are aligned with each other irrespective of the angular displacement of the first joint e or the third joint i. This singularity state also occurs if the elbow joint assembly b is coupled to the third joint at a position radially spaced from the third axis of the third joint.

In the singularity state, the shoulder joint assembly a allows the first joint e or the third joint i to rotate only about the first axis d (=the third axis h) and also allows the second joint g to rotate only about the second axis f. Therefore, the elbow joint assembly b coupled to the third joint i of the shoulder joint assembly a has a reduced number of degrees of freedom for its posture, resulting in poor operability of the arm A.

For example, even for slightly changing the orientation of the fourth axis j of the elbow joint assembly b about the vertical axis in the singularity state shown in FIG. 8, it is necessary to operate the shoulder joint assembly a by rotating the first joint e and the third joint i of the shoulder joint assembly a by 90 degrees in opposite directions respectively about the first axis d and the third axis h, and thereafter rotating the second joint g slightly about the second axis f.

In the singularity state of the shoulder joint assembly a, therefore, the shoulder joint assembly a needs to be operated largely in order to slightly change the position or posture of the elbow joint assembly b, with the result that the flexibility and quickness to change the elbow joint assembly b to a desired position or posture.

The above shortcoming does not exist in a state other than the singularity state of the shoulder joint assembly a (non-singularity state). For example, in the state shown in FIG. 7, the orientation of the fourth axis j of the elbow joint assembly b can slightly be changed to a desired orientation by slightly rotating the first joint e or the third joint i or both.

The inventors have found that the arms A of the anthropomorphic robot of the type described above operate to perform various processes while the elbow joint assembly b is positioned at the same height as or lower than the center of the shoulder joint assembly a, i.e., the point of intersection of the axes d, f, h of the first through third joints e, g, i. This tendency is particularly strong for master-slave anthropomorphic robots whose arms are operated in the same manner as human arms, because of the working ability of the human arms.

With the conventional anthropomorphic robot, however, the layout and posture of the first through third joints of the shoulder joint assembly a have been designed taking into consideration the position of the shoulder joint assembly b of the arm A in the actual operation. Therefore, the singularity state of the shoulder joint assembly a occurs in positions where the elbow joint assembly b can operate when the anthropomorphic robot works. With the anthropomorphic robot shown in FIG. 7, for example, the singularity state occurs when the elbow joint assembly b extends laterally of the torso B at the same height as the center of the shoulder joint assembly a. Such a position of the elbow joint assembly b normally occurs while the anthropomorphic robot is working. Consequently, while the arm A of the conventional anthropomorphic robot is normally working, the singularity state of the shoulder joint assembly a is liable to take place, resulting in impaired operability of the arm A during normal operation of the robot.

In view of the above background, it is an object of the present invention to provide an arm structure for anthropomorphic robots which minimizes the occurrence of a singularity state of a shoulder joint assembly while the arm of the anthropomorphic robot is normally working, for thereby allowing the arm to operate smoothly.

DISCLOSURE OF THE INVENTION

In order to achieve the above object, there is provided in accordance with the present invention an arm structure for an anthropomorphic robot, comprising a shoulder joint assembly having a first joint coupled to a torso for rotation about a first axis, a second joint coupled to the first joint for rotation about a second axis crossing the first axis, and a third joint coupled to the second joint for rotation about a third axis crossing the second axis, the first through third axes intersecting at a single point, and an elbow joint assembly coupled to the third joint of the shoulder joint assembly, characterized in that the position and posture of the first through third joints of the shoulder joint assembly and the position of the elbow joint assembly with respect to the third joint are established such that the elbow joint assembly is located above a horizontal plane lying through the point of intersection of the axes of the first through third joints, while the shoulder joint assembly is operated into a singularity state wherein the first axis of the first joint and the third axis of the third joint are aligned with each other and the elbow joint assembly is positioned laterally of the torso.

Generally, the arm of the anthropomorphic robot does not work while the elbow joint assembly is positioned laterally of the torso and the elbow joint assembly is located above the horizontal plane lying through the point of intersection of the axes of the first through third joints, i.e., the center of the shoulder joint assembly. Therefore, by establishing the position and posture of the first through third joints of the shoulder joint assembly and the position of the elbow joint assembly with respect to the third joint such that the elbow joint assembly is located above a horizontal plane lying through the point of intersection of the axes of the first through third joints, while the shoulder joint assembly is operated into the singularity state and the elbow joint assembly is positioned laterally of the torso, it is possible to prevent the singularity state of the shoulder joint assembly from occurring at the position where the elbow joint assembly is normally operated when the arm of the anthropomorphic robot actually works.

Therefore, the occurrence of the singularity state of the shoulder joint assembly is minimized while the arm of the anthropomorphic robot is normally working, for thereby allowing the arm to operate smoothly.

If the elbow joint assembly is coupled to the third joint on the third axis of the third joint, then the first joint of the shoulder joint assembly is coupled to the torso with the first axis being oriented obliquely upwardly from the torso laterally of the torso, and the second joint and the third joint are coupled respectively to the first joint and the second joint so as to be arranged on the first axis successively from the first joint to the elbow joint assembly in the singularity state of the shoulder joint assembly.

With the above arrangement, the elbow joint assembly is located above the horizontal plane laterally of the torso in the singularity state of the shoulder joint assembly.

If the elbow joint assembly is coupled to the third joint at a position spaced from the third axis of the third joint, then the position and posture of the first through third joints of the shoulder joint assembly are established such that the elbow joint assembly is located above the horizontal plane while the shoulder assembly is operated into the singularity state and the elbow joint assembly is rotated about the third axis to an arbitrary position laterally of the torso.

Specifically, if the elbow joint assembly is coupled to the third joint at a position spaced from the third axis of the third joint, when the first joint and the third joint are rotated respectively about the first axis and the third axis (which are aligned with each other in the singularity state) in the singularity state, the position of the elbow joint assembly moves on a circle whose radius is equal to the distance between the elbow joint assembly and the first and third axes, and the shoulder joint assembly is in the singularity state at any angular positions of the elbow joint assembly. By establishing the position and posture of the first through third joints of the shoulder joint assembly such that the elbow joint assembly is located above the horizontal plane while the shoulder assembly is operated into the singularity state and the elbow joint assembly is rotated about the third axis to an arbitrary position laterally of the torso, it is possible to minimize the occurrence of the singularity state of the shoulder joint assembly when the arm of the anthropomorphic robot actually works.

BEST MODE FOR CARRYING OUT THE INVENTION

Figure 1:
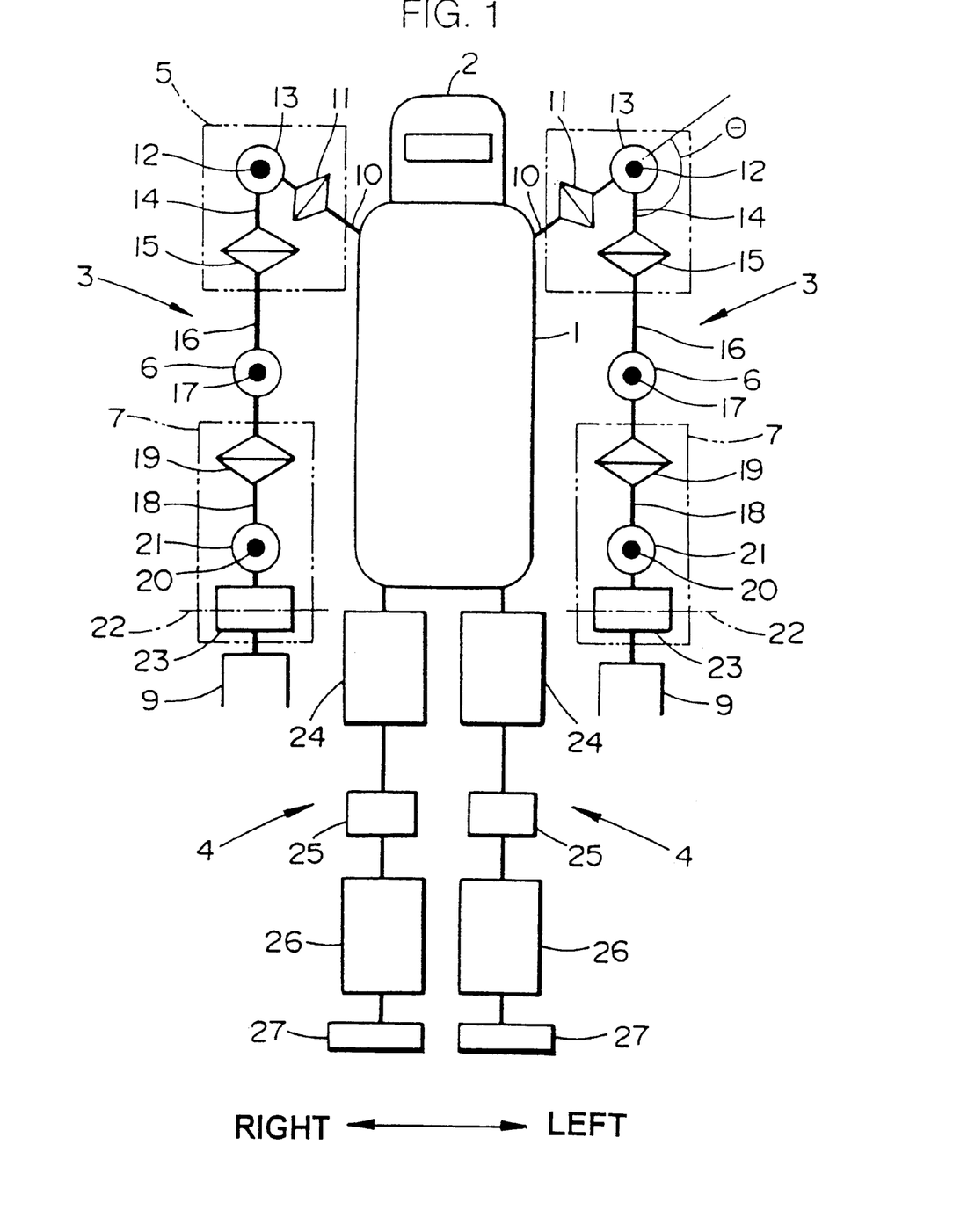
FIG. 1 is a schematic front elevational view of an anthropomorphic robot according to a first embodiment of the present invention.
Figure 2:
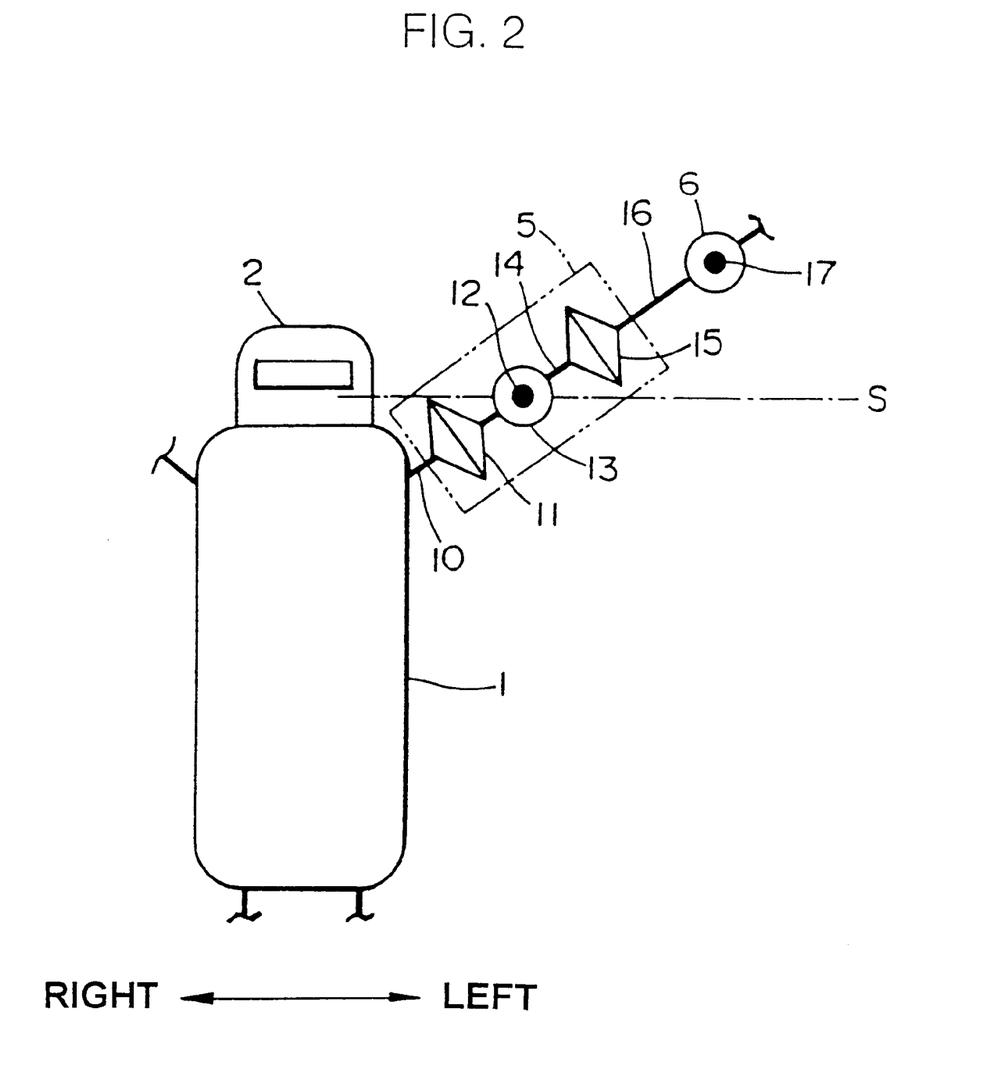
FIG. 2 is a view illustrative of operation of a central part of the robot shown in FIG. 1.

A first embodiment of the present invention will be described below with reference to FIGS. 1 and 2. FIG. 1 is a schematic front elevational view of an anthropomorphic robot according to a first embodiment of the present invention, and FIG. 2 is a view illustrative of operation of a the anthropomorphic robot shown in FIG. 1.

As shown in FIG. 1, the anthropomorphic robot comprises a torso 1, a head 2 mounted on an upper surface of the torso 1, a pair of arms 3 extending from both upper sides of the torso 1, and a pair of legs 4 extending from the lower end of the torso 1. The arms 3 are of an identical structure, and the legs 4 are also of an identical structure.

Each of the arms 3 comprises a shoulder joint assembly 5, an elbow joint assembly 6, a wrist joint assembly 7, and a hand 9 coupled successively in the order from the torso 1.

The shoulder joint assembly 5 comprises a first joint 11 coupled to the torso 1 for rotation about a first axis 10 extending obliquely upwardly laterally from the torso 1, a second joint 13 coupled to the first joint 11 for rotation about a second axis 12 normal to the first axis 10, and a third joint 15 coupled to the second joint 13 for rotation about a third axis 14 normal to the second axis 12. In the illustrated state, the second axis 12 extends in an anterior-posterior direction (normal to the sheet of FIG. 1) and the third axis 14 extends in a vertical direction. The first through third joints 11, 13, 15 are arranged in such a positional relationship that their axes 10, 12, 14 intersect at a point on the second axis 12 in their arbitrary angular positions.

The elbow joint assembly 6 comprises a fourth joint coupled to the third joint 15 by an upper arm 16 on the third axis 14. The fourth joint 6 (the elbow joint assembly 6) is rotatable about a fourth axis 17 (extending in the anterior-posterior direction as shown) normal to the third axis 14.

The wrist joint assembly 7 comprises a fifth joint 19 coupled to the fourth joint 6 (the elbow joint assembly 6) for rotation about a fifth axis 18 extending in a direction (vertical direction in FIG. 1) normal to the fourth axis 17, a sixth joint 21 coupled to the fifth joint 19 for rotation about a sixth axis 20 extending in a direction (the anterior-posterior direction as shown) normal to the fifth axis 18, and a seventh joint 23 coupled to the sixth joint 21 for rotation about a seventh axis 22 extending in a direction (a lateral direction as shown) normal to the sixth axis 20. The hand 9 is coupled to the seventh joint 23.

Each of the first through seventh joints 11, 13, 15, 6, 19, 21, 23 comprises a rotary actuator such as a motor or the like. These joints are operated based on commands from a robot control device (e.g., a master device), not shown, or previously given teaching data, for performing certain work. Each of the joints 11, 13, 15, 6, 19, 21, 23 may comprise a linear actuator such as a cylinder or the like, rather than the rotary actuator, for rotation about the respective axes 10, 12, 14, 17, 18, 20, 22.

With the above structure of the shoulder joint assembly 5, the elbow joint assembly 6, and the wrist joint assembly 7, the shoulder joint assembly 5 can rotate about three axes except for a singularity state, and the elbow joint assembly 6 and the wrist joint assembly 8 can rotate about a single axis and three axes, respectively. Based on these rotating motions, each of the arms 3 can operate in the same manner as a human arm.

Each of the legs 4 comprises a hip joint 24, a knee joint 25, an ankle joint 26, and a foot 27 coupled successively in the order from the torso 1. Although not shown in detail, the hip joint 24 is arranged to rotate about three axes in the anterior-posterior, lateral, and vertical directions, the knee joint 25 is arranged to rotate about a single axis in the lateral direction, and the ankle joint 26 is arranged to rotate about two axes in the anterior-posterior and lateral directions.

With the arms 3 of the above structure, when the second joint 13 of the shoulder joint assembly 5 is turned from the state shown in FIG. 1 counterclockwise about the second axis 12 by an angle Θ, the first axis 10 of the first joint 11 and the third axis 14 of the third joint 15 are aligned with each other, as shown in FIG. 2, resulting in the occurrence of a singularity state of the shoulder joint assembly 5. In this singularity state, for slightly changing the orientation of the fourth axis 17 of the elbow joint assembly 6 in a plane including the second axis 12 and the third axis 14, it is necessary to rotate the first joint 11 and the third joint 15 of the shoulder joint assembly 5 by 90 degrees in opposite directions, and thereafter rotate the second joint 13. Therefore, the first joint 11 and the third joint 15 need to be operated largely.

In the above singularity state, because of the arrangement of the first through third joints 11, 13, 15 of the shoulder joint assembly 5 and the connection of the elbow joint assembly 6 to the third joint 15, the first through third joints 11, 13, 15 and the elbow joint assembly 6 are successively lined up on the first axis 10 (=the third axis 14) extending obliquely upwardly laterally from the torso 1. Therefore, the elbow joint assembly 6 in the singularity state is positioned above a horizontal plane S lying through the point of intersection of the axes 10, 12, 14 of the first through third joints 11, 13, 15 laterally of the torso 1.

The arm 3 of the anthropomorphic robot according to the present embodiment basically works with the elbow joint assembly 6 positioned in or below the horizontal plane S. Therefore, the arm 3 does not basically work with the elbow joint assembly 6 above the horizontal plane S. Consequently, the singularity state of the shoulder joint assembly 5 does not occur while the arm 3 is working. Stated otherwise, the operation of the shoulder joint assembly 5 while the arm 3 is working is in a non-singularity state. As a result, the arm 3 can work smoothly while its smooth operability is ensured.

Theoretically, a singularity state occurs when the second joint 13 is turned 180 degrees about the second axis 12 from the state of the arm 3 shown in FIG. 2. Actually, however, such a state does not occur because of an interference between the arm 3 and the torso 1 or an interference between the first joint 11 and the third joint 13.

Figure 3:
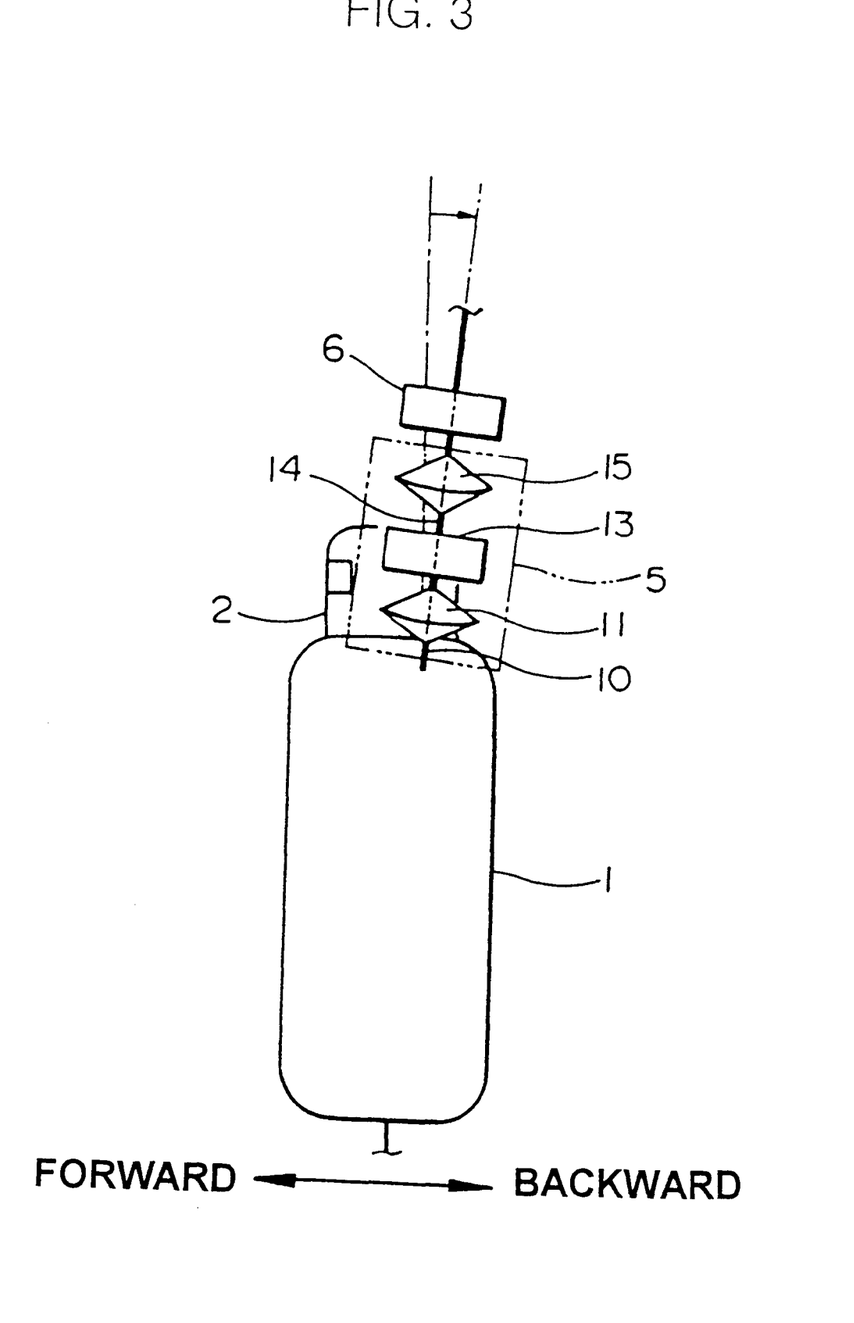
FIG. 3 is a schematic side elevational view of a central part of an anthropomorphic robot according to a modification of the first embodiment of the present invention.

In this embodiment, the first axis 10 of the first joint 11 coupled to the torso 1 extends upwardly directly laterally from the torso 1. However, as shown in FIG. 3, the first axis 10 may be slightly inclined in the anterior-posterior direction of the robot (in FIG. 3, the first axis 10 is slightly inclined backwards).

Figure 4:
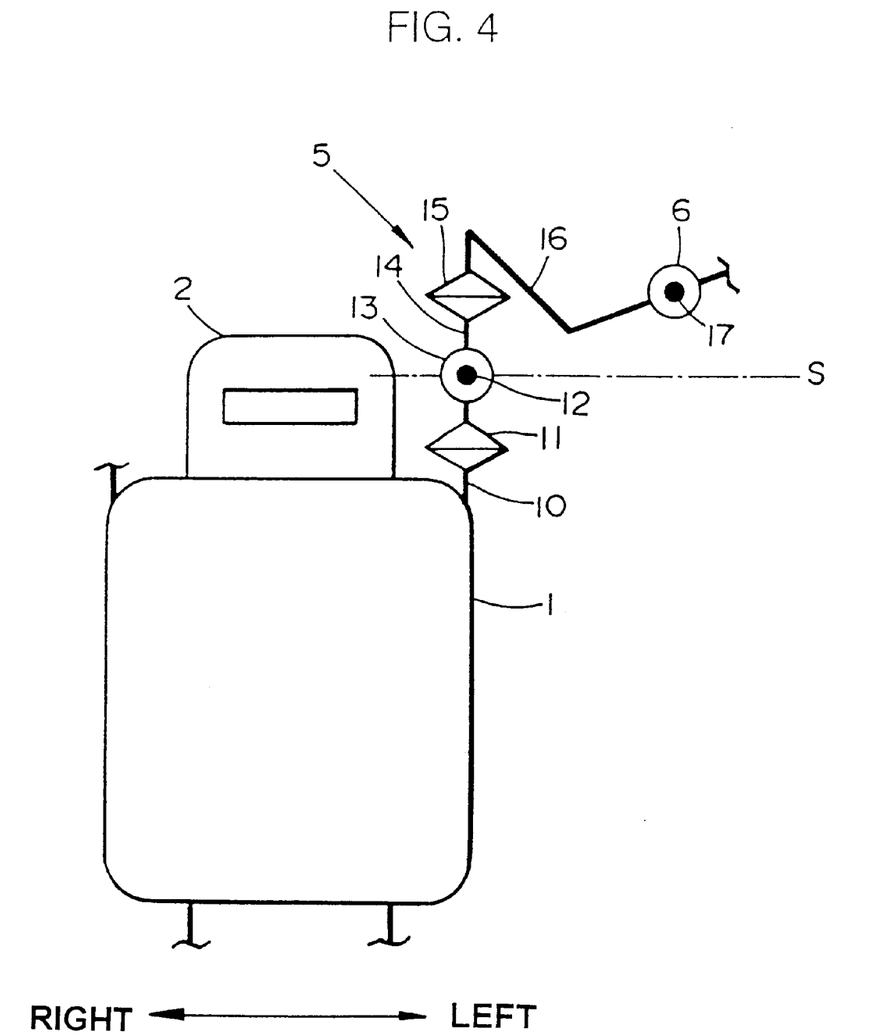
FIG. 4 is a schematic front elevational view of a central part of an anthropomorphic robot according to a second embodiment of the present invention.

A second embodiment of the present invention will be described below with reference to FIG. 4. FIG. 4 is a schematic front elevational view of a central part of an anthropomorphic robot according to the second embodiment of the present invention.

The anthropomorphic robot according to the second embodiment differs from the anthropomorphic robot according to the first embodiment shown in FIGS. 1 and 2 as to the arrangement of the first through third joints of the shoulder joint assembly and the connection of the elbow joint assembly to the third joint. The parts of the robot are denoted by reference numerals identical to those of the robot according to the first embodiment.

As shown in FIG. 4, the shoulder joint assembly 5 of each of the arms 3 (only the left arm 3 of the robot is shown) of the anthropomorphic robot according to the second embodiment has the first through third joints 11, 13, 15 coupled successively in the order from the torso 1, as with the robot according to the first embodiment. The first joint 11 is coupled to the torso 1 with the first axis 10 extending vertically upwardly from the torso 1.

The elbow joint assembly 6 of each of the arms 3 is coupled to the third joint 15 by the upper arm 16 at a position spaced from the third axis 14. As shown in FIG. 4, the elbow joint assembly 6 is positioned with respect to the third joint 15 such that the elbow joint assembly 6 is located above the horizontal plane X lying through the point of intersection of the axes 10, 12, 14 of the first through third joints 11, 13, 15, while the shoulder joint assembly 5 is moved to the singularity state thereof wherein the first axis 10 of the first joint 11 and the third axis 14 of the third joint 15 are aligned with each other and the elbow joint assembly 6 is rotated about the first axis 10 (=the third axis 14) through the rotation of the first joint 11 or the third joint 15 so as to be positioned laterally of the torso 1. To put it another way, the positional relationship of the first through third joints 11, 13, 15 (specifically, the distances between first through third joints 11, 13, 15) is established such that the elbow joint assembly 6 is located above the horizontal plane S when the shoulder joint assembly 5 has been moved to the singularity state thereof and the elbow joint assembly 6 has been positioned laterally of the torso 1.

In the present embodiment, since the first axis 10 of the first joint 11 extends vertically, the elbow joint assembly 6 is located above the horizontal plane S irrespective of the position to which the elbow joint assembly 6 is rotated about the first axis 10 (=the third axis 14) in the illustrated singularity state.

Other details of the robot according to the second embodiment are identical to those of the robot shown in FIGS. 1 and 2.

With the anthropomorphic robot according to the second embodiment, when the shoulder joint assembly 5 has been moved to the singularity state thereof, for slightly changing the orientation of the fourth axis 17 of the elbow joint assembly 6 about a direction perpendicular to the second axis 12 and the third axis 14, it is necessary to rotate the first joint 11 and the third joint 15 by 90 degrees in opposite directions, and thereafter rotate the second joint 13. Therefore, the first joint 11 and the third joint 15 need to be operated largely.

However, in the singularity state of the shoulder joint assembly 5, even when the elbow joint assembly 6 is rotated to any position about the first axis 10 (=the third axis 14), including positions laterally of the torso 1, the elbow joint assembly 6 is located above the horizontal plane S. However, the arm 3 does not basically work with the elbow joint assembly 6 above the horizontal plane S.

In the present embodiment, therefore, while the arm 3 is working, the shoulder joint assembly 5 is basically in a non-singularity state at all times, with the result the arm 3 can work smoothly while its smooth operability is ensured.

Figure 5:
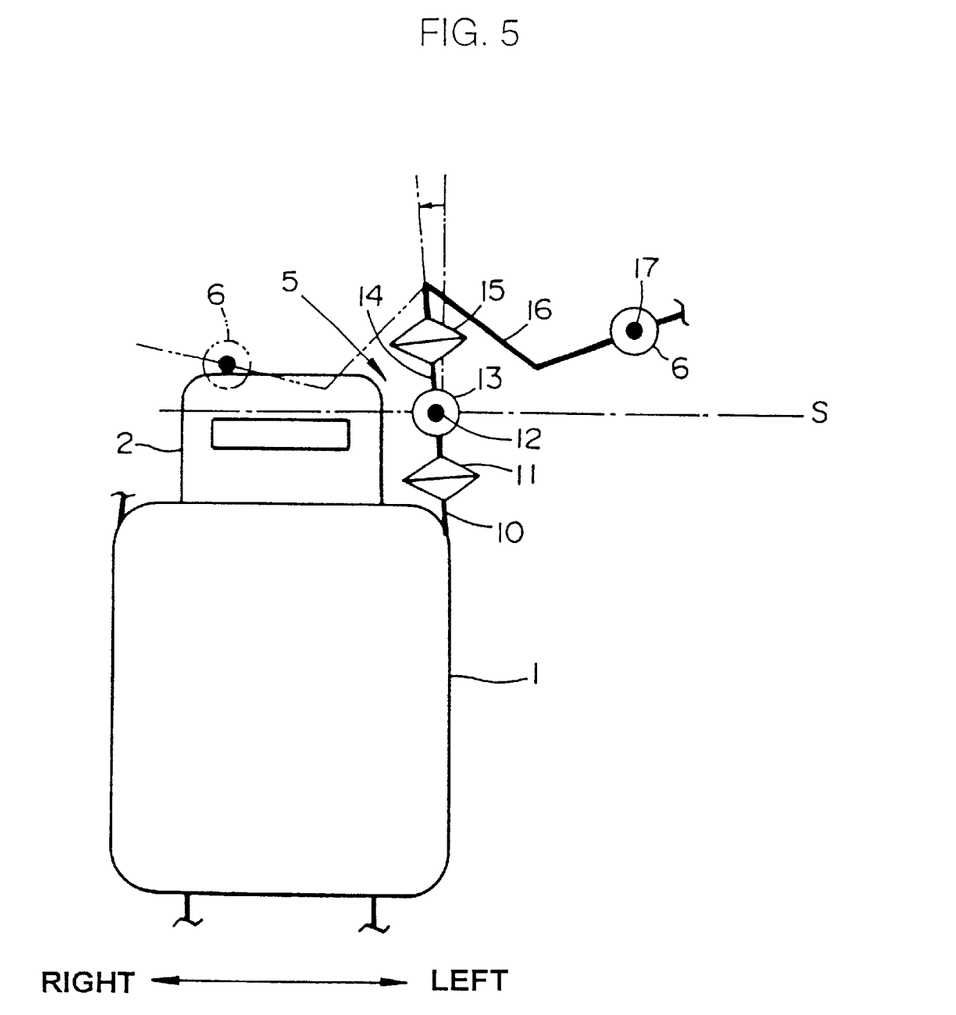
FIG. 5 is a schematic front elevational view of a central part of an anthropomorphic robot according to a modification of the second embodiment of the present invention.

In this embodiment, the first axis 10 of the first joint 11 extends vertically. However, to keep the elbow joint assembly 6 located above the horizontal plane S even when the elbow joint assembly 6 is rotated to any position about the first axis 10 (=the third axis 14), including positions laterally of the torso 1 in the singularity state of the shoulder joint assembly 5, the first axis 10 of the first joint 11 may be slightly inclined inwardly of the torso 1 as shown in FIG. 5 or, inversely, slightly inclined laterally of the torso 1. If the first axis 10 is inclined as shown in FIG. 5, then when the elbow joint assembly 6 is turned 180 degrees about the first axis 10 (=the third axis 14) from the position laterally of the torso 1 as indicated by the imaginary lines in the singularity state of the shoulder joint assembly 5 (actually, such a state of the robot shown in FIG. 5 does not occur because the arm 3 interfere with the head 2), the height of the elbow joint assembly 6 is smallest. Even in this state, the elbow joint assembly 6 is located above the horizontal plane S.

Figure 6:
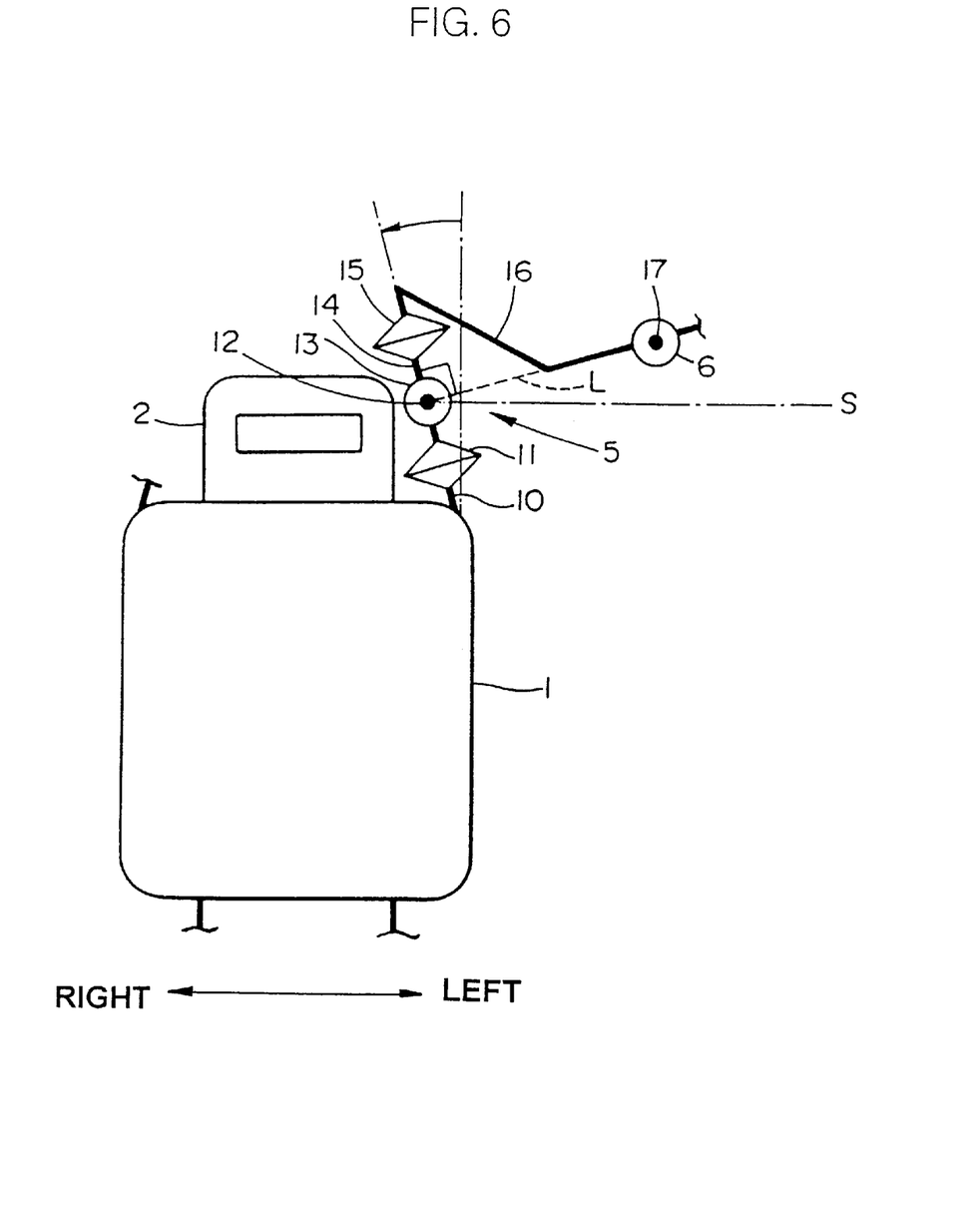
FIG. 6 is a schematic front elevational view of a central part of an anthropomorphic robot according to a third embodiment of the present invention.

A third embodiment of the present invention will be described below with reference to FIG. 6. FIG. 6 is a schematic front elevational view of a central part of an anthropomorphic robot according to the third embodiment of the present invention.

The anthropomorphic robot according to the third embodiment differs from the anthropomorphic robot according to the first embodiment shown in FIGS. 1 and 2 as to the arrangement of the first through third joints of the shoulder joint assembly and the connection of the elbow joint assembly to the third joint. The parts of the robot are denoted by reference numerals identical to those of the robot according to the first embodiment.

As shown in FIG. 6, the shoulder joint assembly 5 of each of the arms 3 (only the left arm 3 of the robot is shown) of the anthropomorphic robot according to the third embodiment has the first through third joints 11, 13, 15 coupled successively in the order from the torso 1, as with the robot according to the first embodiment. The first joint 11 is coupled to the torso 1 with the first axis 10 extending obliquely upwardly from the torso 1 inwardly of the torso 1, as with the robot shown in FIG. 5.

The elbow joint assembly 6 of each of the arms 3 is connected to the third joint 15 by the upper arm 16 at a position spaced from the third axis 14 of the third joint 15 such that a line segment L (indicated as the broken line in FIG. 6) interconnecting the center of the elbow joint assembly 6 (on the fourth axis 17) and the point of intersection of the first through third axes 10, 12, 14 is normal to the first axis 10 and the third axis 14 in the illustrated singularity state of the shoulder joint assembly 5 (in which the first axis 10 and the third axis 14 are aligned with each other).

Other details of the robot according to the third embodiment are identical to those of the robot according to the first embodiment.

With the arms 3 of anthropomorphic robot of the above structure, when the shoulder joint assembly 5 has been moved to the singularity state thereof, and the elbow joint assembly 6 is rotated about the first axis 10 (=the third axis 14) of the shoulder joint assembly 5 so as to be positioned laterally of the torso 1 as shown (more specifically, on the left side of the robot from the second axis 12), the elbow joint assembly 6 is located above the horizontal plane S lying through the point of intersection of the first through third axes 10, 12, 14.

In the singularity state of the shoulder joint assembly 5, when the elbow joint assembly 6 is rotated about the first axis 10 (=the third axis 14) inwardly of the torso 1 (more specifically, on the right side of the robot from the second axis 12), the elbow joint assembly 6 is located below the horizontal plane S. Actually, however, because the arm 3 interferes with the head 2 and the torso 1, the elbow joint assembly 6 cannot be rotated to any arbitrary position inwardly of the torso 1 in the singularity state of the shoulder joint assembly 5. Thus, the range in which the elbow joint assembly 6 can be rotated inwardly of the torso 1 is limited to a relatively small range. In addition, any opportunity for the robot to work with the elbow joint assembly 6 positioned inwardly of the torso 1 in the singularity state of the shoulder joint assembly 5 is considered to be small. When the elbow joint assembly 6 is rotated to a position laterally of the torso 1 in the singularity state of the shoulder joint assembly 5, since the elbow joint assembly 6 is positioned above the horizontal plane S, the arm 3 does not basically work in such a state.

In this embodiment, therefore, the arm 3 normally works almost exclusively in a non-singularity state of the shoulder joint assembly 5, thus ensuring the smooth operability of the arm 3.

INDUSTRIAL APPLICABILITY

The arm structure of the anthropomorphic robot according to the present invention is useful for master-slave anthropomorphic robots whose arms are operated in the same manner as human arms.

What is claimed is:

1. An arm structure for an anthropomorphic robot, comprising a shoulder joint assembly having a first joint coupled to a torso for rotation about a first axis, a second joint coupled to the first joint for rotation about a second axis crossing the first axis, and a third joint coupled to the second joint for rotation about a third axis crossing the second axis, the first through third axes intersecting at a single point, and an elbow joint assembly coupled to the third joint of the shoulder joint assembly, characterized in that the position and posture of the first through third joints of said shoulder joint assembly and the position of said elbow joint assembly with respect to the third joint are established such that said elbow joint assembly is located above a horizontal plane lying through the point of intersection of the axes of said first through third joints, while said shoulder joint assembly is operated into a singularity state wherein the first axis of said first joint and the third axis of said third joint are aligned with each other and said elbow joint assembly is positioned laterally of said torso.

2. An arm structure for an anthropomorphic robot according to claim 1, characterized in that said elbow joint assembly is coupled to said third joint on the third axis of the third joint, the first joint of said shoulder joint assembly is coupled to said torso with the first axis being oriented obliquely upwardly from said torso laterally of said torso, and said second joint and said third joint are coupled respectively to said first joint and said second joint so as to be arranged on said first axis successively from said first joint to said elbow joint assembly in the singularity state of the shoulder joint assembly.

3. An arm structure for an anthropomorphic robot according to claim 1, characterized in that said elbow joint assembly is coupled to said third joint at a position spaced from the third axis of the third joint, and the position and posture of the first through third joints of said shoulder joint assembly are established such that said elbow joint assembly is located above said horizontal plane while said shoulder assembly is operated into said singularity state and said elbow joint assembly has been rotated about said third axis to an arbitrary position laterally of said torso.

* * * * *